United States Patent [19]
Barrera

[11] Patent Number: 4,512,376
[45] Date of Patent: Apr. 23, 1985

[54] APPARATUS FOR FORMING STATOR COILS OF DYNAMO ELECTRIC MACHINES

[76] Inventor: Giorgio Barrera, Via Novalesa 12, Leumann (Torino), Italy

[21] Appl. No.: 512,054

[22] Filed: Jul. 8, 1983

[51] Int. Cl.³ .............................................. B21F 3/00
[52] U.S. Cl. .................................... 140/92.1; 29/596; 29/598
[58] Field of Search .............. 140/92.1, 71 R; 72/305, 72/308, 309; 29/596, 598

[56] References Cited

U.S. PATENT DOCUMENTS

| | | | |
|---|---|---|---|
| 3,559,699 | 2/1971 | Droell | 140/92.1 |
| 3,874,424 | 4/1975 | Muskulus | 140/92.1 |
| 4,121,627 | 10/1978 | Schmid | 140/92.1 |

FOREIGN PATENT DOCUMENTS

| | | | |
|---|---|---|---|
| 2351952 | 4/1974 | Fed. Rep. of Germany | 140/92.1 |
| 1439695 | 6/1976 | United Kingdom | 140/92.1 |

*Primary Examiner*—Francis S. Husar
*Assistant Examiner*—Linda McLaughlin
*Attorney, Agent, or Firm*—Sughrue, Mion, Zinn, Macpeak and Seas

[57] ABSTRACT

Apparatus for forming stator coils, of undulatory type, constituted by multi-lobed turns, for dynamo electric machines comprises a first circumferential series of forming elements located at equal distances from a central axis and equiangularly spaced from each other, and a second circumferential series of forming elements equiangularly located about the central axis and intercalated between the forming elements of the first series. The forming elements of the second series are movable radially relative to the central axis between an outer position, which is spaced from the central axis by a distance greater than the distance of the forming elements of the first series from the central axis, and an inner position which is spaced from the central axis by a distance less than the distance between the forming elements of the first series and the central axis. The apparatus further includes a device for winding a copper wire about the first circumferential series of forming elements so as to form a polygonal shaped coil and cables for moving the forming elements of the second series radially from their outer positions to their inner positions, thrusting them against the sides of the said polygonal coil so as to curve these sides inwards towards the center of the coil, imparting to the latter the desired multi-lobed configuration. The forming elements of the first series are also free to move radially towards the central axis from the position in which they are located during the forming of the polygonal coil, as a result of the thrust exerted against the sides of the polygonal coil by the elements of the second series. Damping mechanisms are provided for opposing the said radial movement of the forming elements of the first series.

7 Claims, 6 Drawing Figures

4,512,376

APPARATUS FOR FORMING STATOR COILS OF DYNAMO ELECTRIC MACHINES

The present invention relates to apparatus for forming stator coils of undulatory type constituted by turns of multi-lobed form, for dynamo-electric machines.

The object of the present invention is to provide apparatus of the said type which is simple, reliable and practical.

SUMMARY OF THE INVENTION

The main characteristic of the apparatus according to the invention lies in the fact that it comprises:

a first circumferential series of forming elements located at equal distances from a central axis and equiangularly spaced from each other, a second circumferential series of forming elements equiangularly located about the said central axis and intercalated between the forming elements of the first series, the forming elements of the second series being movable radially relative to the said central axis between an outer position which is spaced from the central axis by a distance greater than the distance between the central axis and the forming elements of the first series, and an inner position which is spaced from the central axis by a distance less than the distance between the central axis and the forming elements of the first series, means for winding a copper wire about the first circumferential series of forming elements so as to form a polygonal coil, means for moving the forming elements of the second series radially from their outer positions towards their inner positions, thrusting them against the sides of the polygonal coil so as to curve these sides towards the centre of the coil, imparting to the latter its desired multi-lobed configuration, in which the forming elements of the first series are also free to move radially towards the central axis from the position in which they are located during the forming of the polygonal coil, under the action of the thrust exerted against the sides of the polygonal coil by the forming elements of the second series, means for opposing the said radial movement of the forming elements of the first series towards the central axis.

Preferably the said opposing means are constituted by fluid damper means.

According to a further preferred characteristic, the forming elements of the first series and of the second series are each connected to one end of the L-shaped curved flexible cable having a first section extending radially from the respective forming element towards the central axis and a second section extending parallel to and adjacent the central axis, the free end of this second section being connected to a respective slide movable parallel to the central axis to effect the radial displacement of each forming element which is connected thereto, two such slides being provided, the forming elements of the first series and of the second series respectively being connected thereto. The apparatus further includes two double acting fluid cylinders for effecting the movement of the slides; that chamber of the fluid cylinder associated with the forming elements of the first series which diminishes in volume during the radially inward displacement of these elements is connected through a restricted flow passage with a discharge reservoir when the other fluid cylinder effects a radially inward displacement of the forming elements of the second series. This achieves the damping action opposing the radially inward movement of the forming elements of the first series.

According to a further preferred characteristic, the said two slides are mounted for sliding movement parallel to the said central axis on guides carried by a support frame which supports for rotation about the said central axis a bell member having radial guides on which the forming elements of the first series and of the second series are slidably mounted. Means are provided for rotating the bell member to form the polygonal coil; moreover, the two series of flexible cables connected respectively to the forming elements of the first series and of the second series are in their turn connected to two bushes rotatably mounted about the central axis on the two said slides.

A further preferred characteristic of the apparatus according to the invention lies in the fact that the said support frame is movable parallel to the central axis to allow the forming elements, once the undulatory coil has been formed thereon, to be brought adjacent an inserter tool of known type for inserting the coil in the cavity of a stator. Extractor means are moveover provided for thrusting the undulatory coil carried by the forming elements axially so as to remove it from the forming elements and to deposit it on the said inserter tool.

Preferably the extractor means mentioned above comprise a star of radial blades carried at one end of a central axially slidable rod connected to the bell member for rotation therewith.

BRIEF DESCRIPTION OF THE DRAWINGS

Further characteristics and advantages of the present invention will emerge from the description which follows with reference to the appended drawings, provided purely by way of non-limiting example, in which.

DETAILED DESCRIPTION OF THE DRAWINGS

Figure 6:
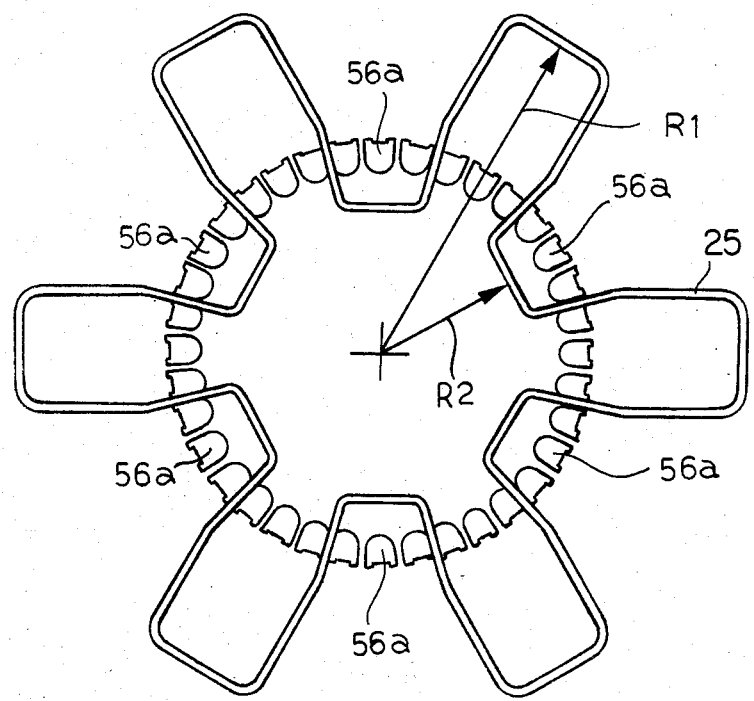
FIG. 6 is a schematic illustration of an undulatory coil obtained by means of the apparatus of FIGS. 1 to 5, disposed on a corresponding inserter tool.

In the drawings, reference numeral 1 generally indicates apparatus for forming stator coils of undulatory type, constituted by multi-lobed turns, for dynamo electric machines. In FIG. 6 the reference numeral 25 indicates the profile of an undulatory coil obtainable by means of the apparatus 1.

This apparatus comprises a fixed structure 2 having two cylindrical vertical guide posts 3 (only one of which is visible in FIG. 2) on which a support frame 5 is slidable with the interposition of bushes 4. The vertical movements of the support frame 5 relative to the fixed structure 2 are effected by a hydraulic cylinder 6 the body of which is fixed to the structure 2 and the shaft of which is connected to an attachment 7 rigid with the support frame 5.

The support frame 5 supports a bell member 10 for rotation about an axis 8 by means of rolling bearings 9. The bell member 10 has a first circumferential series of forming elements 11 (only one of which is visible in FIGS. 1, 2) disposed at equal distances from the central axis 8 and equiangularly spaced from each other (see also FIGS. 3, 4). The bell member 10 is also provided with a second circumferential series of forming elements 12 equiangularly spaced about the said central axis 8 and intercalated between the forming elements 11 of the first series so that each element 12 is interposed between two elements 11.

Each of the forming elements 11 is carried by a support 13 which is slidably mounted on a guide rod 14 carried by the bell member 10 and projecting radially relative to the central axis 8. Each of the forming elements 12 is articulated about an axis 15 to a support 16 which is also slidably mounted on a radial guide rod 17 carried by the bell member 10. This member is fixed to an end flange 18 of a sleeve 19 which is rotatably mounted on the support frame 5 by means of the rolling bearings 9. A pulley 20 is keyed to the sleeve 19 and connected by means of an endless belt 21 to a pulley 22 rotatable by a motor 24 (see FIG. 1) through a shaft 23.

The motor 24 rotates the bell member 10 about the axis 8 by means of the shaft 23, the transmission belt 21 connecting the pulleys 20, 22 and the sleeve 19. The rotation imparted to the bell member 10 allows a copper wire to be wound about the first circumferential series of forming elements 11 so as to form a polygonal shaped coil, part of the profile of which is indicated by 25 in FIG. 3. For this purpose, one of the forming elements 11 has a device 26 for anchoring one end of the copper wire (FIG. 5).

Figure 5:
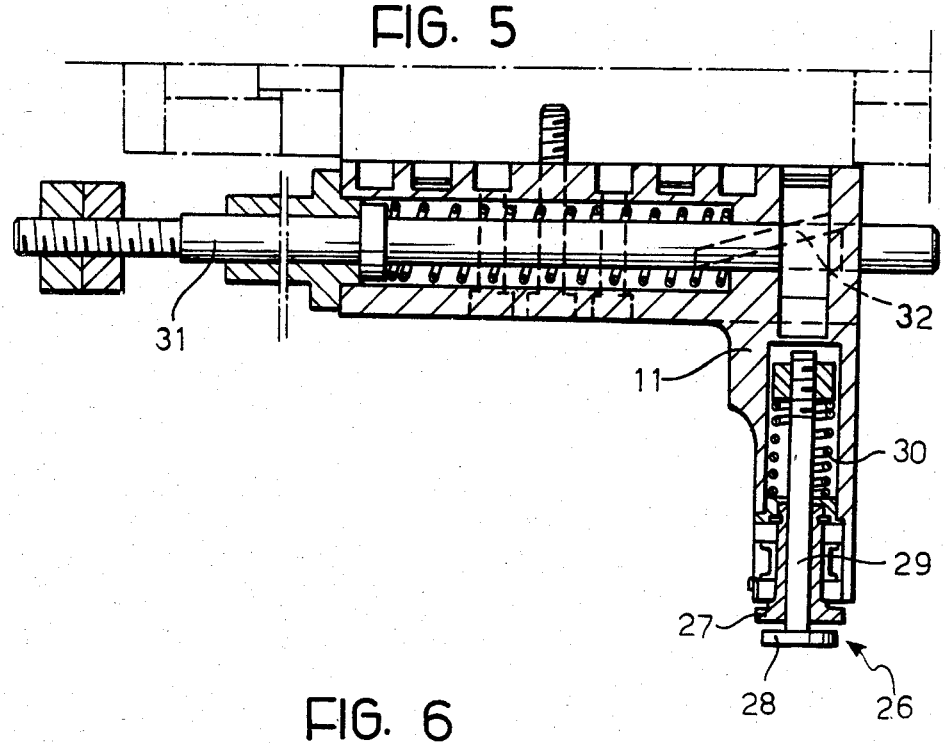
FIG. 5 is a sectional view of a detail of the apparatus.

With reference to FIG. 5, the device 26 includes two horizontal discs 27, 28 of which the first is fixed to the body of the forming element 11 and the second is fixed to one end of a vertical shaft 29 which is urged upwardly by a spring 30. The shaft 29 may be moved downwardly against the action of the spring 30, by movement of a shaft 31 towards the right (as viewed in FIG. 5), the shaft 31 having one end outside the forming element 11 (on which an actuator cylinder, not illustrated in the drawings, acts) and its other end inside the forming element (the right-hand end in FIG. 5) and being arranged to lower the shaft 29 by the engagement therewith of a cam surface 32.

Figure 2:
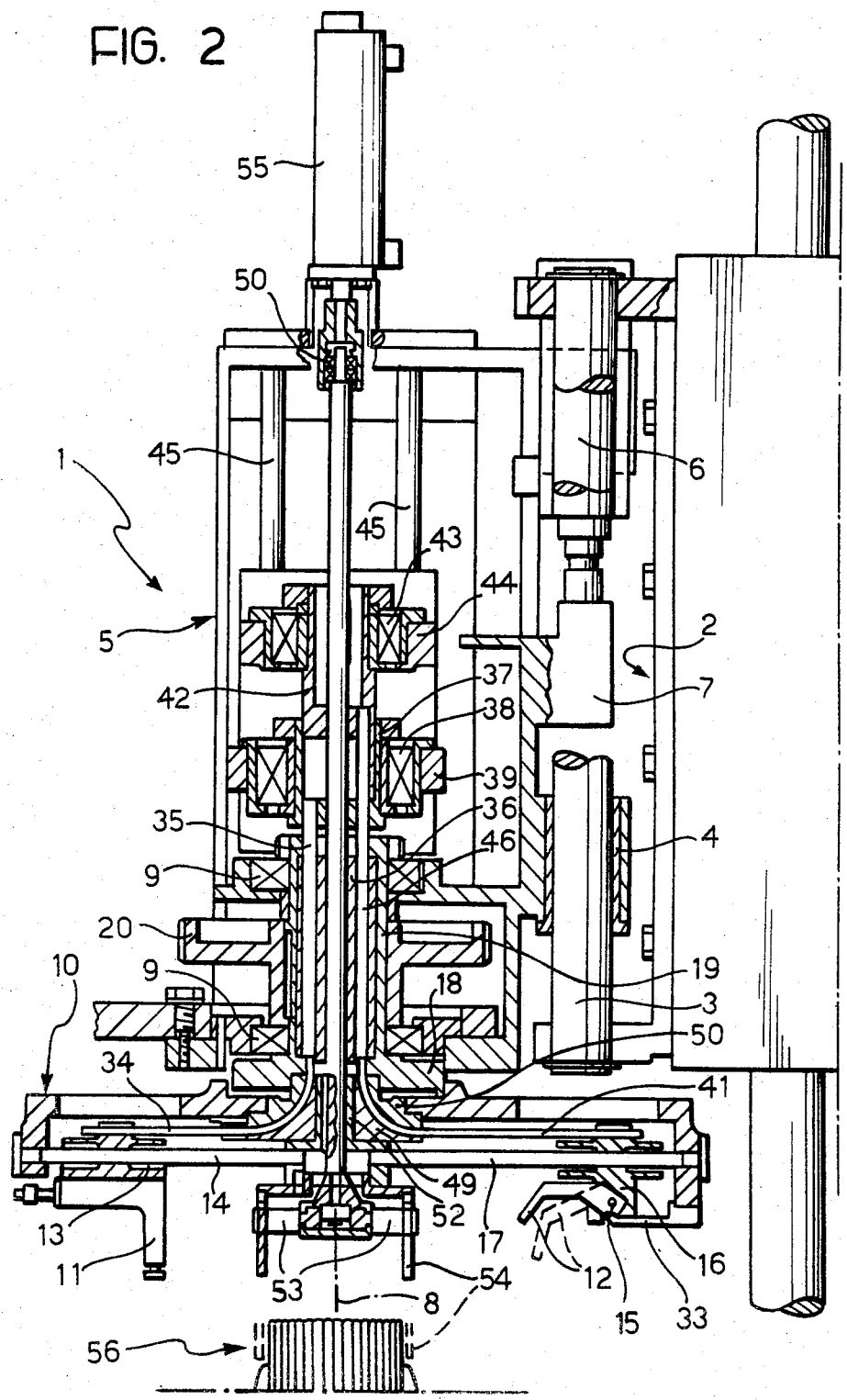
FIG. 2 is a partial sectional view taken on line II—II of FIG. 1, FIGS. 3, 4 are two views of the apparatus of FIGS. 1, 2 from below, illustrating two different conditions of operation of the apparatus.
Figure 3:
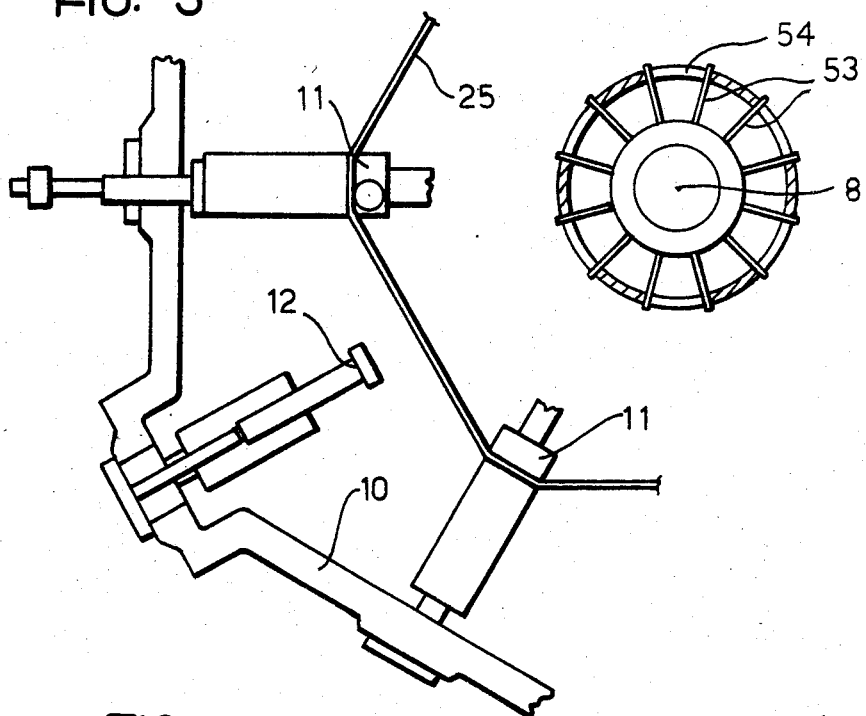
Figure 4:
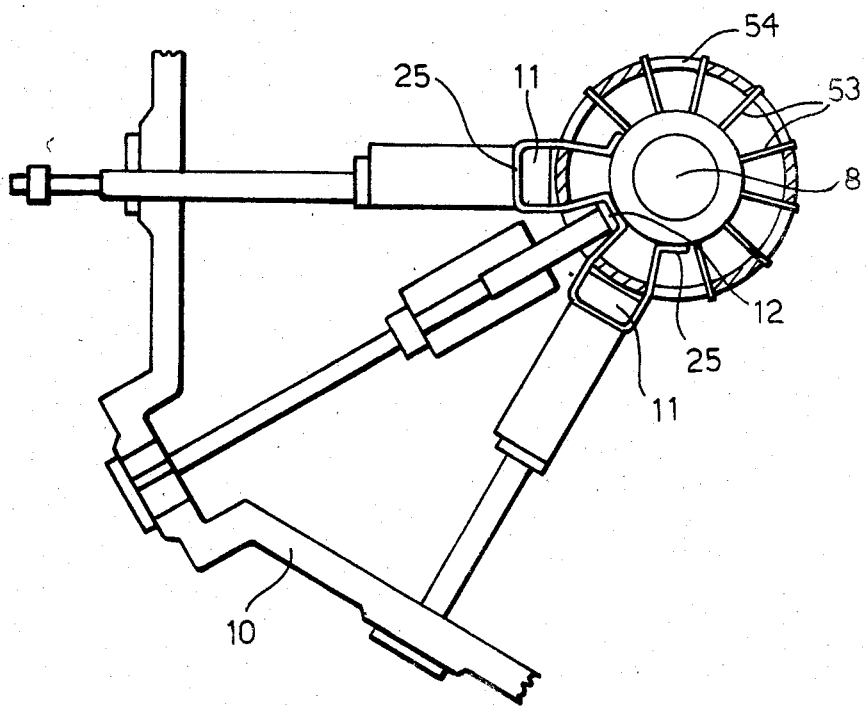

With reference to FIG. 2, each forming element 12 of the second series is movable between an outer position (illustrated in FIGS. 2, 3) and an inner position (illustrated in FIG. 4). When the forming elements 12 are in their outer positions illustrated in FIG. 2, they are engaged by stop members 33 which hold them in the rotated condition illustrated in FIG. 2. In this condition, the forming elements 12 of the second series do not interfere with the copper wire during the winding thereof about the first series of forming elements 11.

Each of the supports 13 of the forming elements 11 of the first series is connected to a flexible, metal cable 34 having an L-shaped curve therein. Each cable 34 has a section extending radially from the respective support 13 towards the central axis 8 and a second section extending parallel to and adjacent the central axis 8. This second section is housed in a sheath of thermo-hardening plastics material 35 which passes through an axial hole in a cylindrical body 36 mounted within the bush 19. The upper ends of the flexible cables 34 which are connected to the forming elements 11 of the first series are connected to a bush 37 which is rotatably mounted about the axis 8 by means of a rolling bearing 38 carried by a slide 39 (see also FIG. 1). The slide 39 is mounted for vertical sliding movement on guide rods 40 carried by the support frame 5.

Similarly, the supports 16 of the forming elements 12 of the second series are connected by means of a further series of flexible cables 41 to a bush 42 which is rotatably mounted about the axis 8 by means of a rolling bearing 43 on a slide 44 mounted for vertical sliding movement on guide rods 45 (also visible in FIG. 2) carried by the support frame 5. Each flexible cable 41, in a manner similar to the cables 34, has a first section extending radially from the respective support 16 towards the central axis 8 and a second section extending parallel to and adjacent the axis 8 and housed with a sheath 46 which passes through a corresponding hole in the cylindrical body 36.

Figure 1:
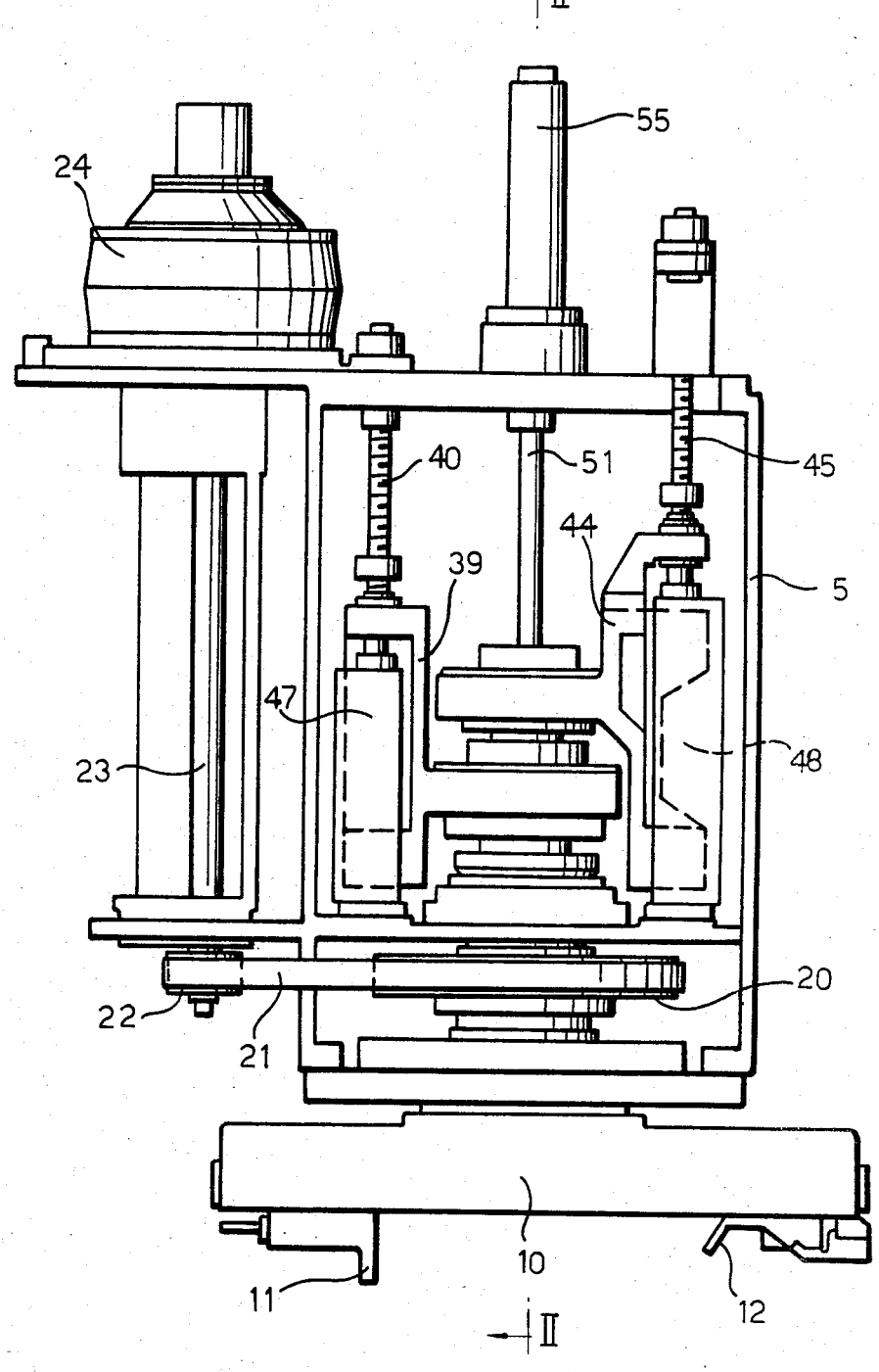
FIG. 1 is a side elevational view of an apparatus according to the present invention.

The vertical movements of the two slides 39, 44 relative to the support frame 5 are effected by two actuator cylinders 47, 48 carried by the frame 5 (see FIG. 1).

The central elbow portions of the flexible cables 34, 41 are guided in passages of corresponding shape defined by two half bushes 49, 50 constituting the hub of the bell member 10.

The apparatus 1 finally includes a central rod 51 freely rotatably mounted by means of rolling bearings 50 on the support frame 5 and connected for rotation with a bush 52 fixed within the hub of the bell member 10. The bush 52 has a cup shaped end which supports the inner ends of the radial guide rods 14, 17. Furthermore, to the lower end of the central rod 51 there is fixed a star of radial blades 53. The outer ends of the blades 53 are guided for vertical sliding movement by a slotted skirt 54 fixed to the cup shaped end of the bush 52.

The central rod 51 is movable axially relative to the support frame 5 and this movement is effected by means of a hydraulic cylinder 55.

In FIG. 2 an inserter tool 56 of known type (see for example U.S. Pat. No. 3,324,536) is shown in broken outline and is intended to receive the undulatory coil after it has been formed by the apparatus 1 and to insert it subsequently in the cavity of a stator.

The operation of the apparatus described above is as follows.

As already mentioned above, a coil having a polygonal profile of the type indicated by 25 in FIG. 3 is first formed.

For this purpose the forming elements 11, 12 are located in the radially outer positions illustrated in FIG. 2. One end of the wire from which the coil is to be formed is anchored by means of the device 26 to one of the forming elements 11. The bell member 10 is then rotated by means of the motor 24. As a result of this rotation the copper wire is wound about the circumferential series of forming elements 11, forming the polygonal coil 25. During this phase, the stop members 33 keep the forming elements 12 in the rotated position illustrated in FIG. 2 so as not to interfere with the copper wire during its winding on the forming elements 11. As is illustrated in FIG. 3, when the forming elements 12 are in their radially outer positions they are spaced from the central axis 8 by a distance greater than the distance between this axis and the forming elements 11.

Once the forming of the polygonal coil 25 has been completed the motor 24 is stopped and the slide 44 is raised relative to the support frame 5 by means of the cylinder 48. Upon this raising, the bush 42 connected to the slide 44 moves the supports 16 of the forming elements 12 of the second series radially inwardly by means of the flexible metal cables 41. Immediately the supports 16 have moved towards the central axis 8, the forming elements 12 disengage from the stop members 33 and move into the operative condition illustrated in broken outline in FIG. 2. The raising of the slide 44 being continued, the forming elements 12 of the second series then come into contact with the sides of the polygonal coil 25 and curve them inwardly so as to give the polygonal coil the desired multi-lobed configuration (see FIG. 4).

During this stage, the chamber of the cylinder 47 which reduces in volume as a result of a radially inward movement of the forming elements 11 is connected to a discharge reservoir (not illustrated) through a restricted flow passage (not illustrated).

By virtue of this arrangement, the forming elements 11 of the first series are free to move radially inwardly as a result of the thrust exerted by the forming elements 12 of the second series against the sides of the polygonal coil 25; however, the radially inward movement of the forming elements 11 is opposed by the cylinder 47 which, during this stage, acts as a damper.

FIG. 4 illustrates the positions of the forming elements 11, 12 at the end of the forming stage. In this condition, the forming elements 12 of the second series are located in the inner positions closer to the central axis 8 than the corresponding inner positions of the forming elements 11.

The fact that the forming elements 11 of the first series are also free to move radially inwardly during the inward movement of the forming elements 12 of the second series allows the apparatus 1 to be used to form undulatory coils of different proportions, that is, with different values of the ratio between their outer diameter $R_1$ and their inner diameter $R_2$ (see FIG. 6). Indeed, if the forming elements 11 of the first series were in a radially fixed position, the apparatus 1 would be usable to form undulatory coils having a ratio $R_2/R_1$ not less than a determined value. Below this value there would be a risk of the metal wire breaking as a result of the thrust exerted thereon by the forming elements 12.

In the apparatus according to the invention, the forming elements 11 of the first series are, however, free to move radially inwardly under the action of the thrust exerted on the sides of the polygonal coil 25 by the forming elements 12 of the second series so as to allow undulatory coils to be formed with any value of the ratio $R_2/R_1$ while at the same time avoiding risk of the copper wire breaking. At the same time, the use of the damper means arranged to oppose the radially inward movement of the forming elements 11 of the first series allows these forming elements 11 to present the resistance necessary to form the coil with the multi-lobed configuration.

Once the undulatory coil has been formed, the cylinder 6 lowers the support frame 5 relative to the fixed structure 2 so as to bring the lower end of the rod 51 close to the inserter tool 56 (in FIG. 2 the position of the slotted skirt 54 corresponding to the lowered condition of the support frame 5 is illustrated in broken outline). Once the support frame 5 has been lowered the cylinder 56 lowers the rod 51. As a result of this lowering the radial blades 53 push the coil 2 axially downwardly, inserting it between the blades 56a of the inserter tool as illustrated schematically in FIG. 6. In order to facilitate this operation, the elements 11 are previously moved slightly towards the axis 8 so as to reduce the tension of the copper wire thereon.

Once the undulatory coil has been deposited on the inserter tool 56, the cylinder 55 raises the rod 51 and the cylinder 6 returns the support frame 5 to its raised position. The cylinders 47, 48 are then actuated to return the forming elements 11, 12 to their radially outer positions. The apparatus is thus arranged again to form another coil.

Preferably several apparatuses of the type described above are mounted on the same machine. In this case, the fixed structure 2 is constituted by a central column which supports the various apparatuses for forming the coils at equiangularly spaced positions. Below the apparatuses, the machine has a rotatable platform on which several inserter tools are located. The number of inserter tools is equal to the number of apparatuses for forming the undulatory coils. After each inserter tool has received the undulatory coil from the corresponding forming apparatus disposed above it, the rotatable platform is rotated so as to bring each inserter tool beneath the adjacent forming apparatus which deposits a new undulatory coil thereon which is angularly offset relative to the previous one.

Naturally, while adhering to the principle of the invention, constructional details and embodiments may be varied widely with respect to that described and illustrated without thereby departing from the scope of the invention.

What is claimed is:

1. Apparatus for forming stator coils of the undulatory type, comprised of multi-lobed turns, for dynamo-electric machines, wherein the apparatus comprises:

a support frame having a rotatable member mounted therein, a first circumferential series of forming elements carried by said rotatable members and located at equal distances from a central axis and equiangularly spaced from each other, a second circumferential series of forming elements carried by said rotatable member and equiangularly located about the said central axis and intercalated between the forming elements of the first series, the forming elements of the second series being movable radially relative to the said central axis between an outer position which is spaced from the central axis by a distance greater than the distance between the central axis and the forming elements of the first series, and an inner position which is spaced from the central axis by a distance less than the distance between the central axis and the forming elements of the first series, means for winding a copper wire about the first circumferential series of forming elements by rotation of said rotatable member so as to form a polygonal coil, means movably carried by said support frame for moving the forming elements of the second series radially from their outer positions towards their inner positions, thrusting them against the sides of the polygonal coil so as to curve these sides towards the centre of the coil, imparting the desired undulatory multi-lobed configuration to the coil, support means carried by said rotatable member for supporting the forming elements of the first series for free radial movement towards the central axis from the position in which they are located during the forming of the polygonal coil, under the action of the thrust exerted against the sides of the polygonal coil by the forming elements of the second series, and means carried by said support means for opposing the said radial movement of the forming elements of the first series towards the central axis.

2. Apparatus as defined in claim 1, wherein the said opposing means are comprised of fluid damper means.

3. Apparatus as defined in claim 2, wherein respective L-shaped curved flexible cables are connected to each of the forming elements of the first series and of the second series, each said flexible cable having a first section extending radially from the respective forming element towards the central axis and a second section extending parallel to and adjacent said central axis, the apparatus further including two respective slides carried by said frame and movable parallel to the central axis and connected to the respective cables to effect radial displacement of the respective forming elements of the first and second series respectively, and two double-acting fluid cylinders mounted on said frame for effecting movement of the slides, that chamber of the fluid cylinder associated with the forming elements of the first series which diminishes in volume during the radially inward displacement of these elements being connected through a restricted flow passage with a discharge reservoir when the other fluid cylinder effects a radially inward displacement of the forming elements of the second series.

4. Apparatus as defined in claim 3, and further including guides carried by said support frame, the said slides being mounted for sliding movement parallel to the said central axis on said guides, said rotatable member comprising a bell member supported by the support frame for rotation about the central axis, radial guides carried by the bell member for guiding radial sliding movement of the forming elements of the first and the second series, and means for rotating the bell member to form the polygonal coil, wherein the two series of flexible cables connected respectively to the forming elements of the first series and of the second series are connected to two bushes mounted on the two said slides for rotation about the central axis.

5. Apparatus as defined in claim 4, wherein the support frame is movable parallel to the central axis to allow the forming elements once the undulatory coil has been formed thereon, to be moved into a position adjacent an inserter tool of known type for inserting the coil in the cavity of a stator, and wherein the apparatus further includes extractor means carried by said support frame for pushing the undulatory coil carried by the forming elements axially so as to remove it from said elements and locate it on the inserter tool.

6. Apparatus as defined in claim 5, wherein the extractor means include a central axially movable rod and a star of radial blades carried at one end of said rod.

7. Apparatus as defined in claim 4, wherein each forming element of the second series is articulated to a support slidable on the respective radial guide and wherein the said bell member has stop members which engage the forming elements of the second series when these are in their radially outer positions to retain them in a rotated condition-in which they do not interfere with the copper wire during the winding of the polygonal coil about the first series of forming elements.

* * * * *